(12) United States Patent
Noh et al.

(10) Patent No.: US 9,005,073 B1
(45) Date of Patent: Apr. 14, 2015

(54) PLANETARY GEAR TRAIN OF AN AUTOMATIC TRANSMISSION FOR A VEHICLE

(71) Applicant: Hyundai Motor Company, Seoul (KR)

(72) Inventors: Myonghoon Noh, Whasung-Si (KR); Seongwook Ji, Whasung-Si (KR); Kangsoo Seo, Whasung-Si (KR); Seong Wook Hwang, Whasung-Si (KR); Jae Chang Kook, Whasung-Si (KR); wonmin Cho, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/140,373

(22) Filed: Dec. 24, 2013

(30) Foreign Application Priority Data

Oct. 14, 2013 (KR) ......................... 10-2013-0122244

(51) Int. Cl.
*F16H 3/66* (2006.01)
*F16H 3/62* (2006.01)

(52) U.S. Cl.
CPC ........... *F16H 3/62* (2013.01); *F16H 2200/0073* (2013.01); *F16H 2200/2012* (2013.01); *F16H 2200/2046* (2013.01)

(58) Field of Classification Search
CPC ................ F16H 2200/0073; F16H 2200/2012; F16H 2200/2046; F16H 3/66

USPC .......................................... 475/275–291, 330
See application file for complete search history.

(56) References Cited

U.S. PATENT DOCUMENTS

| | | | |
|---|---|---|---|
| 2010/0216589 A1* | 8/2010 | Hart et al. ..................... | 475/275 |
| 2010/0331138 A1* | 12/2010 | Phillips ......................... | 475/278 |
| 2012/0088625 A1* | 4/2012 | Phillips et al. ................ | 475/275 |
| 2013/0217534 A1* | 8/2013 | Kirchhoffer ................... | 475/276 |

* cited by examiner

*Primary Examiner* — Roger Pang
(74) *Attorney, Agent, or Firm* — Morgan, Lewis & Bockius LLP

(57) ABSTRACT

A planetary gear train includes first, second, third and fourth planetary gear sets, first rotating body including first sun gear, second rotating body including first planet carrier, third rotating body including first ring gear and third and fourth sun gears, fourth rotating body including second sun gear, fifth rotating body including second planet carrier, sixth rotating body including second ring gear and third planet carrier, seventh rotating body including third ring gear and fourth planet carrier, an eighth rotating body including fourth ring gear, first clutch variably connecting the first and fourth rotating bodies, second clutch variably connecting the second and fourth rotating bodies, third clutch variably connecting the third and fifth rotating bodies, fourth clutch variably connecting the fifth and eighth rotating bodies, first brake variably connecting the first rotating body and the transmission housing, and second brake variably connecting the eighth rotating body and the transmission housing.

3 Claims, 14 Drawing Sheets

FIG. 2

|  | C1 | C2 | C3 | C4 | B1 | B2 | Gear ratio |
|---|---|---|---|---|---|---|---|
| 1ST |  | ● | ● |  |  | ● | 5.920 |
| 2ND | ● |  | ● |  |  | ● | 3.478 |
| 3RD | ● | ● |  |  |  | ● | 2.800 |
| 4TH | ● |  |  |  | ● | ● | 2.191 |
| 5TH | ● |  |  | ● |  | ● | 1.409 |
| 6TH | ● |  |  | ● | ● |  | 1.089 |
| 7TH | ● | ● |  | ● |  |  | 1.000 |
| 8TH |  | ● |  | ● | ● |  | 0.834 |
| 9TH |  |  | ● | ● | ● |  | 0.783 |
| 10TH |  | ● | ● |  | ● |  | 0.695 |
| 11TH | ● |  | ● |  | ● |  | 0.496 |
| Rev |  | ● |  | ● |  | ● | -3.600 |

PLANETARY GEAR TRAIN OF AN AUTOMATIC TRANSMISSION FOR A VEHICLE

CROSS-REFERENCE TO RELATED APPLICATION

The present application claims priority to Korean Patent Application No. 10-2013-0122244 filed on Oct. 14, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that may improve power delivery performance and reduce fuel consumption.

2. Description of Related Art

Increase of gas price may be factor that drives competition for enhancement of fuel consumption.

For an engine, research is made for weight reduction and enhancement of fuel consumption by down-sizing, and for an automatic transmission, research is made for achieving drivability and fuel consumption competitiveness by achieving more multi-stage of the transmission.

However, when an automatic transmission has more shift stages, it requires more number of parts and may deteriorate installability, weight, efficiency, etc.

Thus, in order to effectively achieve enhancement of fuel consumption by achieving more shift-stages, it is important to develop a planetary gear train that may become more efficient with less number of employed parts.

In this regard, an eight speed or nine speed automatic transmission is recently realized, and a planetary gear train of even more speeds is under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that realizes eleventh forward speeds and one reverse speed by a combination of a plurality of planetary gear sets and a plurality of frictional elements, wherein, by operating merely three frictional elements at each shift-speed, the number of non-operated frictional elements is minimized to reduce friction loss, and achieving improvement of power delivery performance and reduction of fuel consumption.

An exemplary embodiment of the present invention may include an input shaft receiving a torque of an engine, an output shaft outputting a changed torque, a first planetary gear set disposed at the input shaft and having a first sun gear, a first planet carrier, and first ring gear, a second planetary gear set disposed rearward to the first planetary gear set and having a second sun gear, a second planet carrier, and a second ring gear, a third planetary gear set disposed rearward to the second planetary gear set and having a third sun gear, a third planet carrier, and a third ring gear, a fourth planetary gear set disposed rearward to the third planetary gear set and having a fourth sun gear, a fourth planet carrier, and fourth ring gear, a first rotating body including the first sun gear, a second rotating body including the first planet carrier and being directly connected the input shaft, a third rotating body including the first ring gear and the third and fourth sun gears, a fourth rotating body including the second sun gear, a fifth rotating body including the second planet carrier, a sixth rotating body including the second ring gear and the third planet carrier, a seventh rotating body including the third ring gear and the fourth planet carrier and being directly connected to the output shaft, an eighth rotating body including the fourth ring gear, a first clutch variably connecting the first rotating body and the fourth rotating body, a second clutch variably connecting the second rotating body and the fourth rotating body, a third clutch variably connecting the third rotating body and the fifth rotating body, a fourth clutch variably connecting the fifth rotating body and the eighth rotating body, a first brake variably connecting the first rotating body and the transmission housing, and a second brake variably connecting the eighth rotating body and the transmission housing.

The first, second, third, and fourth planetary gear sets may be respectively single pinion planetary gear sets.

A first forward speed may be achieved by simultaneous operation of the second and the third clutch and the second brake. A second forward speed may be achieved by simultaneous operation of the first and third clutches and the second brake. A third forward speed may be achieved by simultaneous operation of the first, second clutch and the second brake. A fourth forward speed may be achieved by simultaneous operation of the first clutch and the first and second brakes. A fifth forward speed may be achieved by simultaneous operation of the first and fourth clutches and the second brake. A sixth forward speed may be achieved by simultaneous operation of the first and fourth clutches and the first brake. A seventh forward speed may be achieved by simultaneous operation of the first and second clutches and the fourth clutch. An eighth forward speed may be achieved by simultaneous operation of the second and fourth clutches and the first brake. A ninth forward speed may be achieved by simultaneous operation of the third and fourth clutches and the first brake. A tenth forward speed may be achieved by simultaneous operation of the second and third clutches and the first brake. An eleventh forward speed may be achieved by simultaneous operation of the first and third clutches and the first brake. A reverse speed may be achieved by simultaneous operation of the second and fourth clutches and the second brake.

According to an exemplary embodiment of the present invention, four planetary gear sets of simple planetary gear sets are combined to form six frictional elements so as to realize eleven forward speeds, and thereby improves power delivery performance and fuel consumption.

In addition, three frictional elements for each shift-speed, and thereby the number of non-operated frictional elements is minimized so as to reduce power loss by reducing drag torque.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of frictional elements for respective shift-speeds applied to a planetary gear train according to an exemplary embodiment of the present invention.

Figure 1:
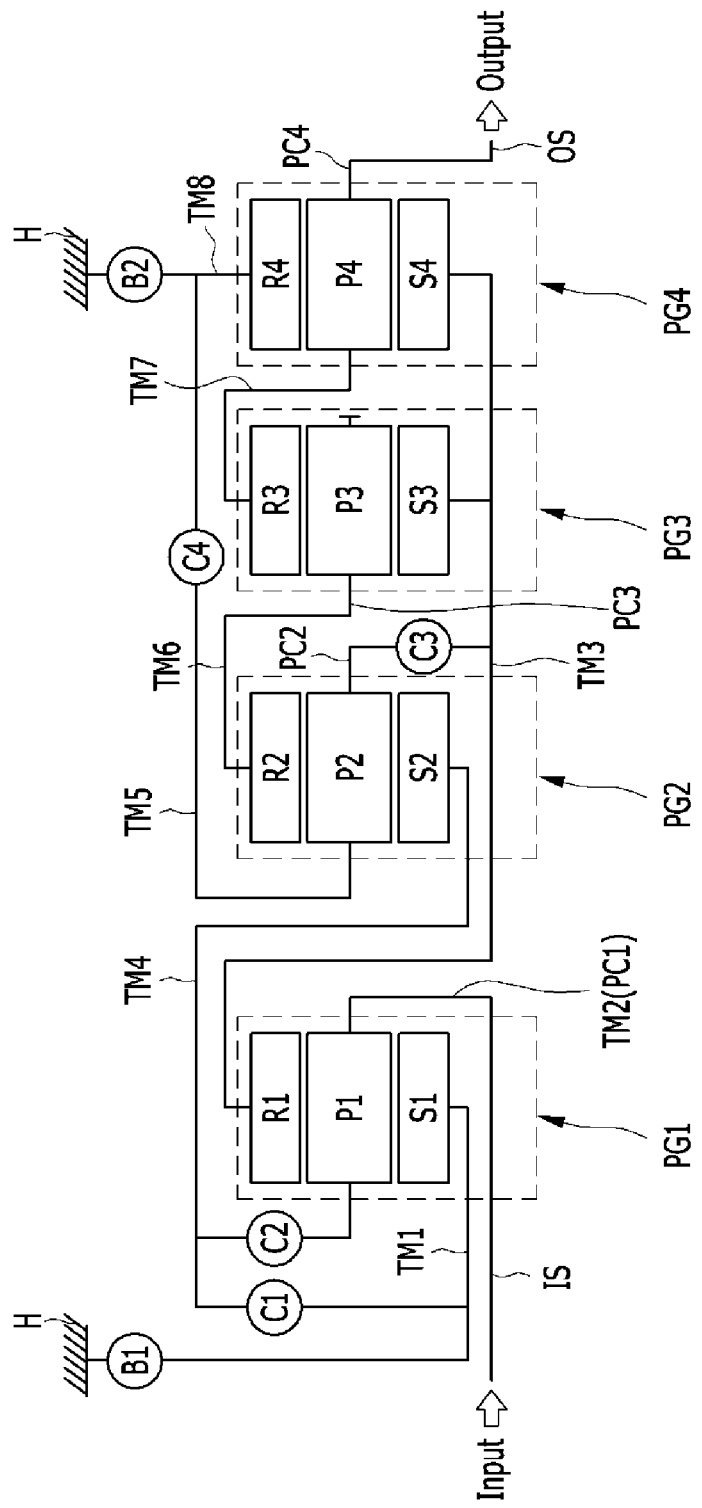
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention is described in detail with reference to accompanying drawings.

The drawings and description are to be regarded as illustrative in nature and not restrictive, and like reference numerals designate like elements through the specification.

Using the terms of the first and the second etc. is for discriminating the components having the same name and they are not limited to the order.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 that are coaxially disposed, an input shaft IS, an output shaft OS, eight rotating bodies TM1 to TM8 directly interconnecting rotational elements of the first, second, third, and fourth planetary gear sets PG1, PG2, PG3, and PG4, six frictional elements C1 to C4 and B1 to B2, and a transmission housing H.

An input speed inputted through the input shaft IS is changed by cooperative operation of the first, second, third, and fourth planetary gear sets PG1, PG2, PG3, and PG4 and is outputted through the output shaft OS.

The simple planetary gear sets are disposed in an order of first, second, third, and fourth planetary gear sets PG1, PG2, PG3, and PG4 from the engine.

The input shaft IS acts as an input member, and receives torque of a crankshaft of the engine through a torque converter.

The output shaft OS acts as an output member, and outputs driving torque through a differential apparatus so as to drive driven wheels.

The first planetary gear set PG1 is a single pinion planetary gear set, and includes, as rotational elements, a first sun gear S1, a first planet carrier PC1 supporting a first pinion P1 externally meshed with the first sun gear S1, and a first ring gear R1 internally meshed with the first pinion P1.

The second planetary gear set PG2 is a single pinion planetary gear set, and includes, as rotational elements, a second sun gear S2, a second planet carrier PC2 supporting a second pinion P2 externally meshed with the second sun gear S2, and a second ring gear R2 internally meshed with the second pinion P2.

The third planetary gear set PG3 is a single pinion planetary gear set, and includes, as rotational elements, a third sun gear S3, a third planet carrier PC3 supporting a third pinion P3 externally meshed with the third sun gear S3, and a third ring gear R3 internally meshed with the third pinion P3.

The fourth planetary gear set PG4 is a single pinion planetary gear set, and includes, as rotational elements, a fourth sun gear S4, a fourth planet carrier PC4 supporting a fourth pinion P4 externally meshed with the fourth sun gear S4, and a fourth ring gear R4 internally meshed with the fourth pinion P4.

Each of the first and second planetary gear sets PG1 and PG2 only employs independent rotational elements that are not interconnected in the respective planetary gear sets. The third and fourth planetary gear sets PG3 and PG4 are formed as a compound planetary gear set CPG.

In the compound planetary gear set CPG, the third sun gear S3 and the fourth sun gear S4 are directly interconnected, and the third ring gear R3 and the fourth planet carrier PC4 are directly interconnected, such that four rotational elements are formed.

One rotational element of the compound planetary gear set CPG is directly connected with a rotational element of the first planetary gear set PG1, another rotational element of the compound planetary gear set CPG is directly connect with a rotational element of the second planetary gear set PG2, such that eight rotating bodies TM1 to TM8 is formed in total.

An arrangement of the eight rotating bodies TM1 to TM8 is as follows.

The first rotating body TM1 includes the first sun gear S1, and is selectively connected with the transmission housing H.

The second rotating body TM2 includes the first planet carrier PC1, and is directly connected with the input shaft IS.

The third rotating body TM3 includes the first ring gear R1 and the third and fourth sun gears S3 and S4.

The fourth rotating body TM4 includes the second sun gear S2, and is selectively connected with the first rotating body TM1 and the second rotating body TM2.

The fifth rotating body TM5 includes the second planet carrier PC2.

The sixth rotating body TM6 includes the second ring gear R2 and the third planet carrier PC3.

The seventh rotating body TM7 includes the third ring gear R3 and the fourth planet carrier PC4, and is directly connected with the output shaft OS.

The eighth rotating body TM8 includes the fourth ring gear R4, and is selectively connected with the fifth rotating body TM3 and the transmission housing H.

Frictional elements of four clutches C1, C2, C3, and C4 are disposed so as to selectively interconnect the rotating bodies TM1 to TM8 and the input shaft IS.

Frictional elements of two brakes B1 and B2 are disposed so as to selectively interconnect corresponding rotating bodies among the rotating bodies TM1 to TM8 to the transmission housing H.

The first clutch C1 is interposed between the first rotating body TM1 and the fourth rotating body TM4 and enables the first and fourth rotating bodies TM1 and TM4 to selectively become integral.

The second clutch C2 is interposed between the second rotating body TM2 and the fourth rotating body TM4 and enables the second and fourth rotating bodies TM2 and TM4 to selectively become integral.

The third clutch C3 is interposed between the third rotating body TM3 and the fifth rotating body TM5 and enables the third and fifth rotating bodies TM3 and TM5 to selectively become integral.

The fourth clutch C4 is interposed between the fifth rotating body TM5 and the eighth rotating body TM8 and enables the fifth and eighth rotating bodies TM5 and TM8 to selectively become integral.

The first brake B1 is interposed between the first rotating body TM1 and the transmission housing H and enables the first rotating body TM1 to selectively act as a fixed element.

The second brake B2 is interposed between the eighth rotating body TM8 and the transmission housing H and enables the eighth rotating body TM8 to selectively act as a fixed element.

Each of the frictional elements of the first, second, third, and fourth clutches C1, C2, C3, and C4 and the first and second brakes B1 and B2 may be formed as a multi-plate friction unit that is engaged by hydraulic pressure.

FIG. 2 is an operational chart of frictional elements for respective shift-speeds applied to a planetary gear train according to an exemplary embodiment of the present invention.

As shown in FIG. 2, a planetary gear train according to an exemplary embodiment of the present invention achieves shifting by operation of three frictional elements at each shift-speed.

The first forward speed 1ST is achieved by simultaneous operation of the second and third clutches C2 and C3 and the second brake B2.

The second forward speed 2ND is achieved by simultaneous operation of the first and third clutch C1 and C3 and the second brake B2.

The third forward speed 3RD is achieved by simultaneous operation of the first and second clutches C1 and C2 and the second brake B2.

The fourth forward speed 4TH is achieved by simultaneous operation of the first clutch C1 and the first and second brakes B1 and B2.

The fifth forward speed 5TH is achieved by simultaneous operation of the first and fourth clutches C1 and C4 and the second brake B2.

The sixth forward speed 6TH is achieved by simultaneous operation of the first and fourth clutches C1 and C4 and the first brake B1.

The seventh forward speed 7TH is achieved by simultaneous operation of the first, second, and fourth clutch C1, C2, and C4.

The eighth forward speed 8TH is achieved by simultaneous operation of the second and fourth clutches C2 and C4 and the first brake B1.

The ninth forward speed 9TH is achieved by simultaneous operation of the third and fourth clutches C3 and C4 and the first brake B1.

The tenth forward speed 10TH is achieved by simultaneous operation of the second and third clutches C2 and C3 and the first brake B1.

The eleventh forward speed 11TH is achieved by simultaneous operation of the first and third clutches C1 and C3 and the first brake B1.

The reverse speed REV is achieved by simultaneous operation of the second and fourth clutches C2 and C4 and the second brake B2.

FIG. 3 to FIG. 14 are shift diagrams for each shift-speed of a planetary gear train according to an exemplary embodiment of the present invention, and illustrate, by lever analysis method, shifting operation according to an exemplary embodiment of the present invention.

Referring to FIG. 3 to FIG. 14, three vertical lines of the first planetary gear set PG1 are the first rotating body TM1, the second rotating body TM2, and the third rotating body TM3 from the left to the right. Three vertical lines of the second planetary gear set PG2 are the fourth rotating body TM4, the fifth rotating body TM5, and the sixth rotating body TM6 from the left to the right. Four vertical lines of the compound planetary gear set CPG are the third rotating body TM3, the sixth rotating body TM6, the seventh rotating body TM7, and the eighth rotating body TM8 from the left to the right.

In addition, the middle horizontal line designate rotation speed "0", the upper horizontal line designate rotation speed "1", the lower horizontal line designates rotation speed "−1", and the sign "−" designate a reverse rotation.

The rotation speed "1" is from the assumption that the rotation speed of the input shaft IS is "1". Spacing between vertical lines of the first and second planetary gear sets PG1 and PG2 and the compound planetary gear set CPG is determined according to gear ratios (number of teeth of a sun gear/number of teeth of a ring gear) thereof.

Allocating rotating bodies to the vertical lines is well known to a person of an ordinary skill in the field of a planetary gear train, and a further detailed description is omitted.

Shifting operation of each shift-speed of a planetary gear train according to an exemplary embodiment of the present invention is hereinafter described in detail with reference to FIG. 2 and FIGS. 3A to 3L.

[First Forward Speed]

Referring to FIG. 2, for the first forward speed 1ST, the second clutch C2, the third clutch C3, and second brake B2 are controlled to operate.

Figure 3:
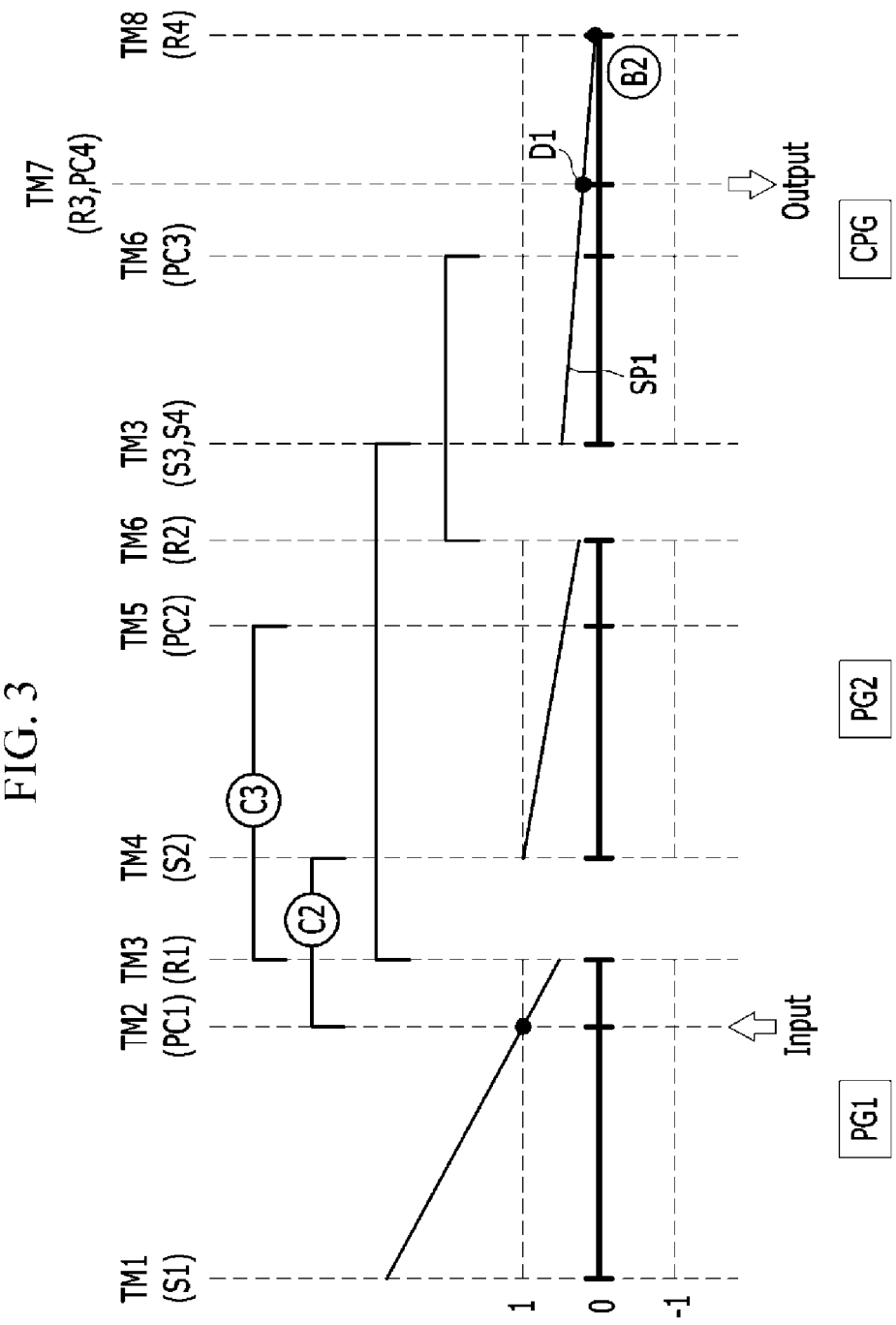
FIG. 3 is a shift diagram for a first forward speed of a planetary gear train according to an exemplary embodiment of the present invention.

Then, as shown in FIG. 3, while torque is input through the second rotating body TM2, the second rotating body TM2 and the fourth rotating body TM4 are interconnected by operation of the second clutch C2, the third rotating body TM3 and the fifth rotating body TM5 are interconnected by the operation of the third clutch C3, and simultaneously, the eighth rotating body TM8 acts as a fixed element by the operation of the second brake B2.

Accordingly, the compound planetary gear set CPG forms a first speed line SP1 by the cooperative operation of the first and second planetary gear sets PG1 and PG2, and shifting to the first forward speed is achieved by outputting D1 through the output element of the seventh rotating body TM7.

[Second Forward Speed]

For the second forward speed 2ND, the second clutch C2 operated at the first forward speed is released, and the first clutch C1 is operated.

Figure 4:
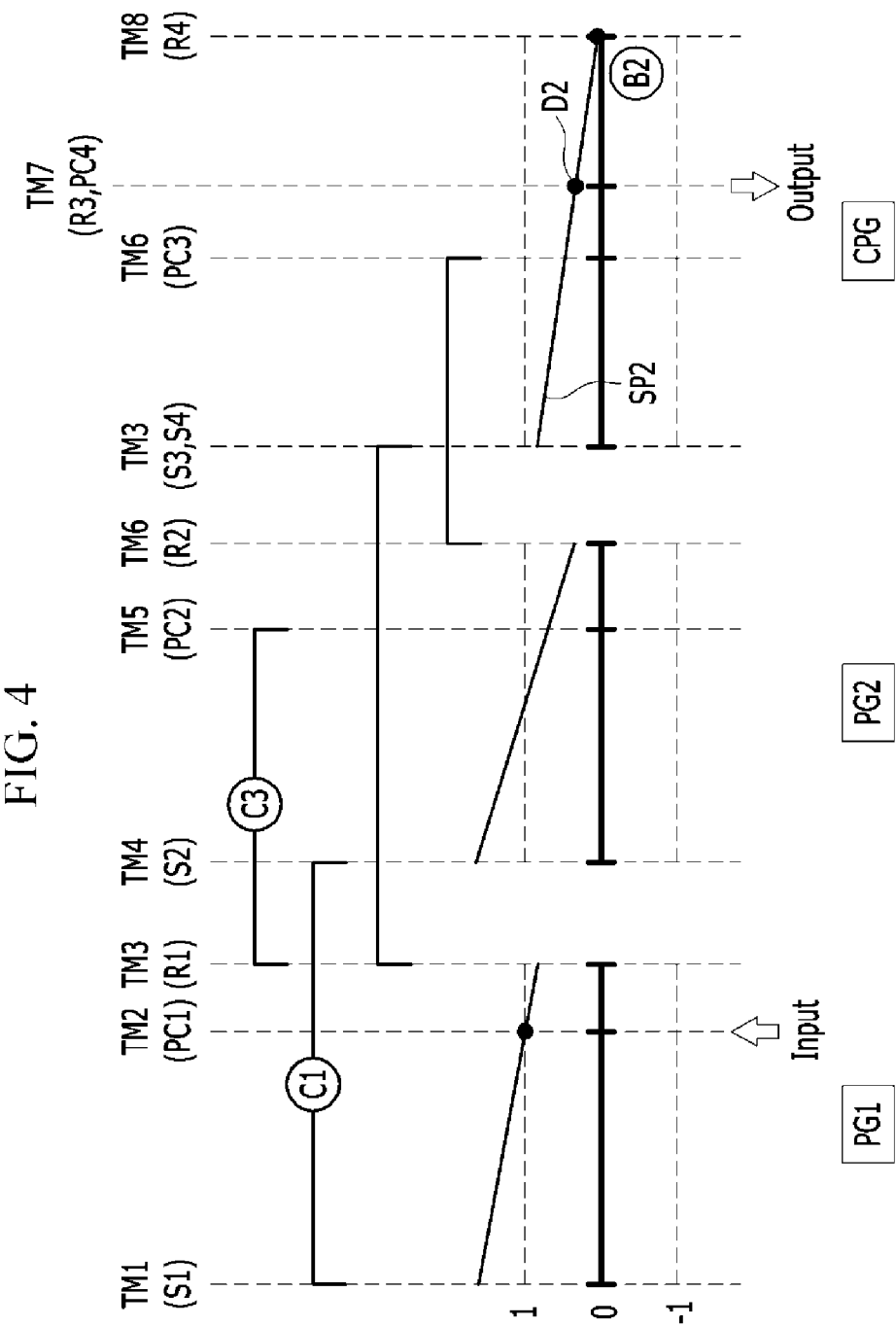
FIG. 4 is a shift diagram for a second forward speed of a planetary gear train according to an exemplary embodiment of the present invention.

Then, as shown in FIG. 4, while torque is input through the second rotating body TM2, the first rotating body TM1 and the fourth rotating body TM4 are interconnected by the operation of the first clutch C1, the third rotating body TM3 and the fifth rotating body TM5 are interconnected by the operation of the third clutch C3, and simultaneously, the eighth rotating body TM8 acts as a fixed element by the operation of the second brake B2.

Accordingly, the compound planetary gear set CPG forms a second speed line SP2 by the cooperative operation of the first and second planetary gear sets PG1 and PG2, and shifting to the second forward speed is achieved by outputting D2 through the output element of the seventh rotating body TM7.

[Third Forward Speed]

For the third forward speed 3RD, the third clutch C3 operated at the second forward speed is released, and the second clutch C2 is operated.

Figure 5:
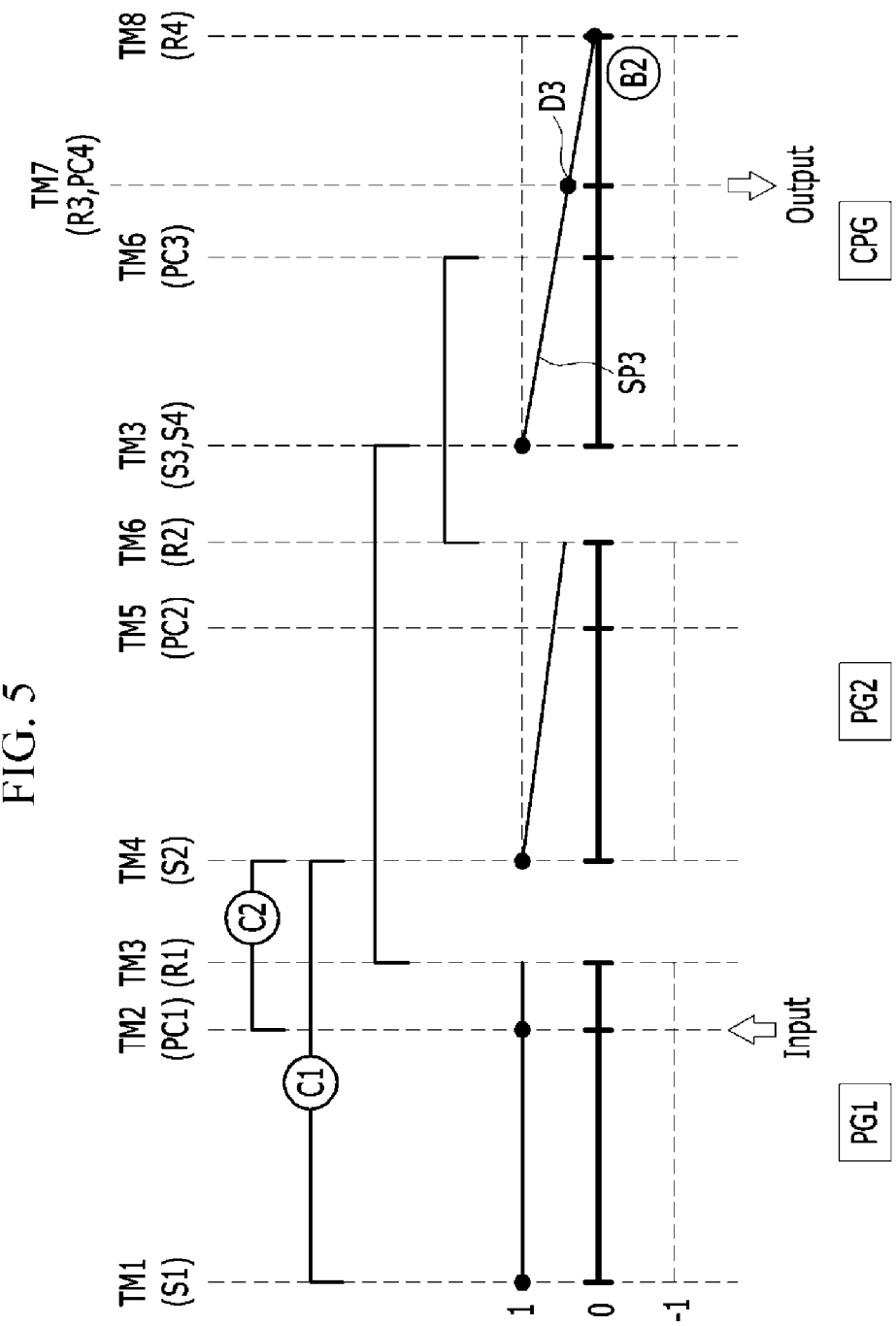
FIG. 5 is a shift diagram for a third forward speed of a planetary gear train according to an exemplary embodiment of the present invention.

Then, as shown in FIG. 5, while torque is input through the second rotating body TM2, the first rotating body TM1 and the fourth rotating body TM4 are interconnected by the operation of the first clutch C1, the second rotating body TM2 and the fourth rotating body TM4 are interconnected by the operation of the second clutch C2, and simultaneously, the eighth rotating body TM8 acts as a fixed element by the operation of the second brake B2.

Accordingly, the compound planetary gear set CPG forms a third speed line SP3 by the cooperative operation of the first and second planetary gear sets PG1 and PG2, and shifting to the third forward speed is achieved by outputting D3 through the output element of the seventh rotating body TM7.

[Fourth Forward Speed]

For the fourth forward speed 4TH, the second clutch C2 operated at the third forward speed is released, and the first brake B1 is operated.

Figure 6:
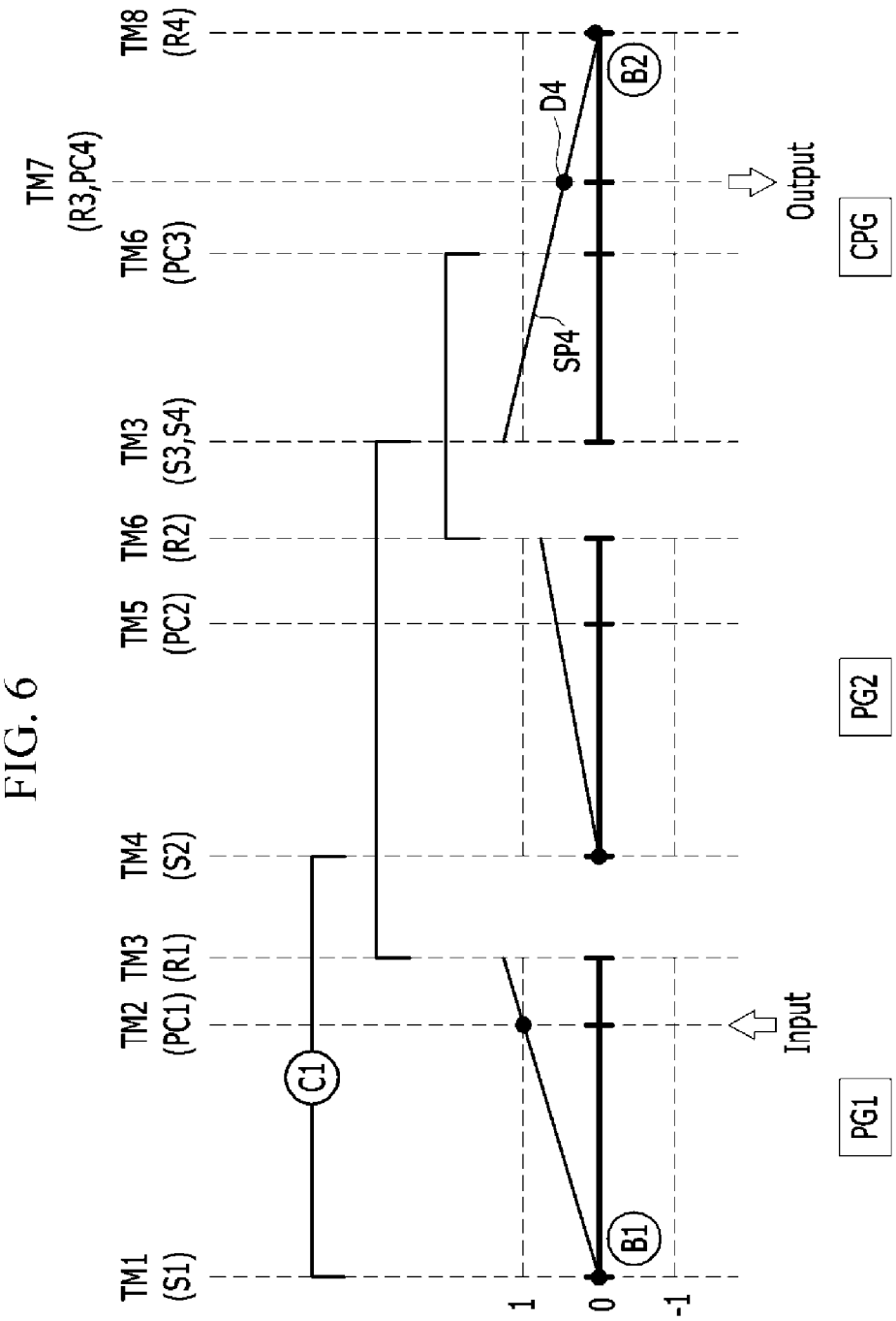
FIG. 6 is a shift diagram for a fourth forward speed of a planetary gear train according to an exemplary embodiment of the present invention.

Then, as shown in FIG. 6, while torque is input through the second rotating body TM2, the first rotating body TM1 and the fourth rotating body TM4 are interconnected by the operation of the first clutch C1, the first rotating body TM1 and the fourth rotating body TM4 act as fixed elements by the operation of the first brake B1, and simultaneously, the eighth rotating body TM8 acts as a fixed element by the operation of the second brake B2.

Accordingly, the compound planetary gear set CPG forms a fourth speed line SP4 by the cooperative operation of the first and second planetary gear sets PG1 and PG2, and shifting to the fourth forward speed is achieved by outputting D4 through the output element of the seventh rotating body TM7.

[Fifth Forward Speed]

For the fifth forward speed 5TH, the first brake B1 operated at the fourth forward speed is released, and the fourth clutch C4 is operated.

Figure 7:
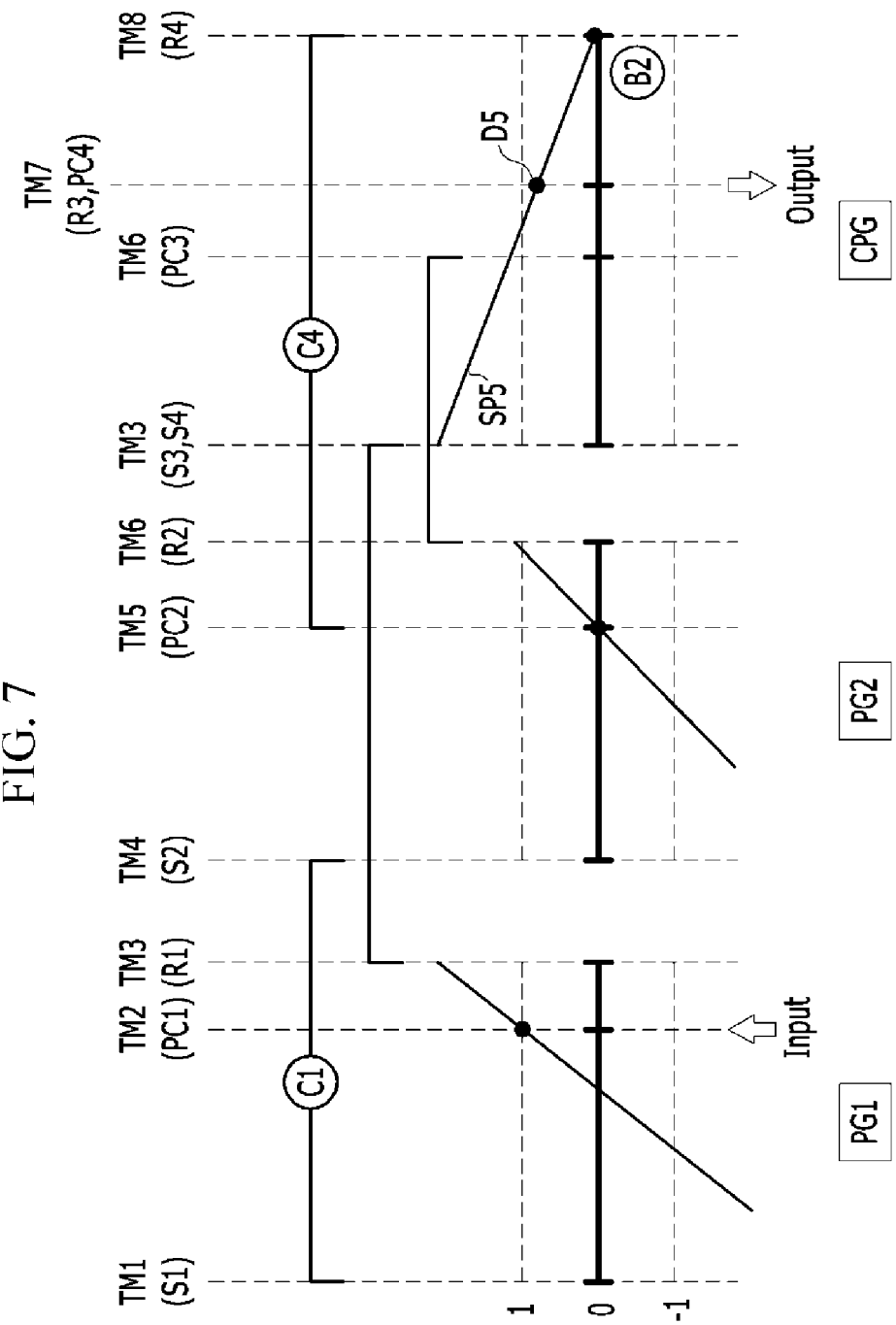
FIG. 7 is a shift diagram for a fifth forward speed of a planetary gear train according to an exemplary embodiment of the present invention.

Then, as shown in FIG. 7, while torque is input through the second rotating body TM2, the first rotating body TM1 and the fourth rotating body TM4 are interconnected by the operation of the first clutch C1, the fifth rotating body TM5 and the eighth rotating body TM8 are interconnected by the operation of the fourth clutch C4, and simultaneously, the eighth rotating body TM8 acts as a fixed element by the operation of the second brake B2.

Accordingly, the compound planetary gear set CPG forms a fifth speed line SP5 by the cooperative operation of the first and second planetary gear sets PG1 and PG2, and shifting to the fifth forward speed is achieved by outputting D5 through the output element of the seventh rotating body TM7.

[Sixth Forward Speed]

For the sixth forward speed 6TH, the second brake B2 operated at the fifth forward speed is released, and the first brake B1 is operated.

Figure 8:
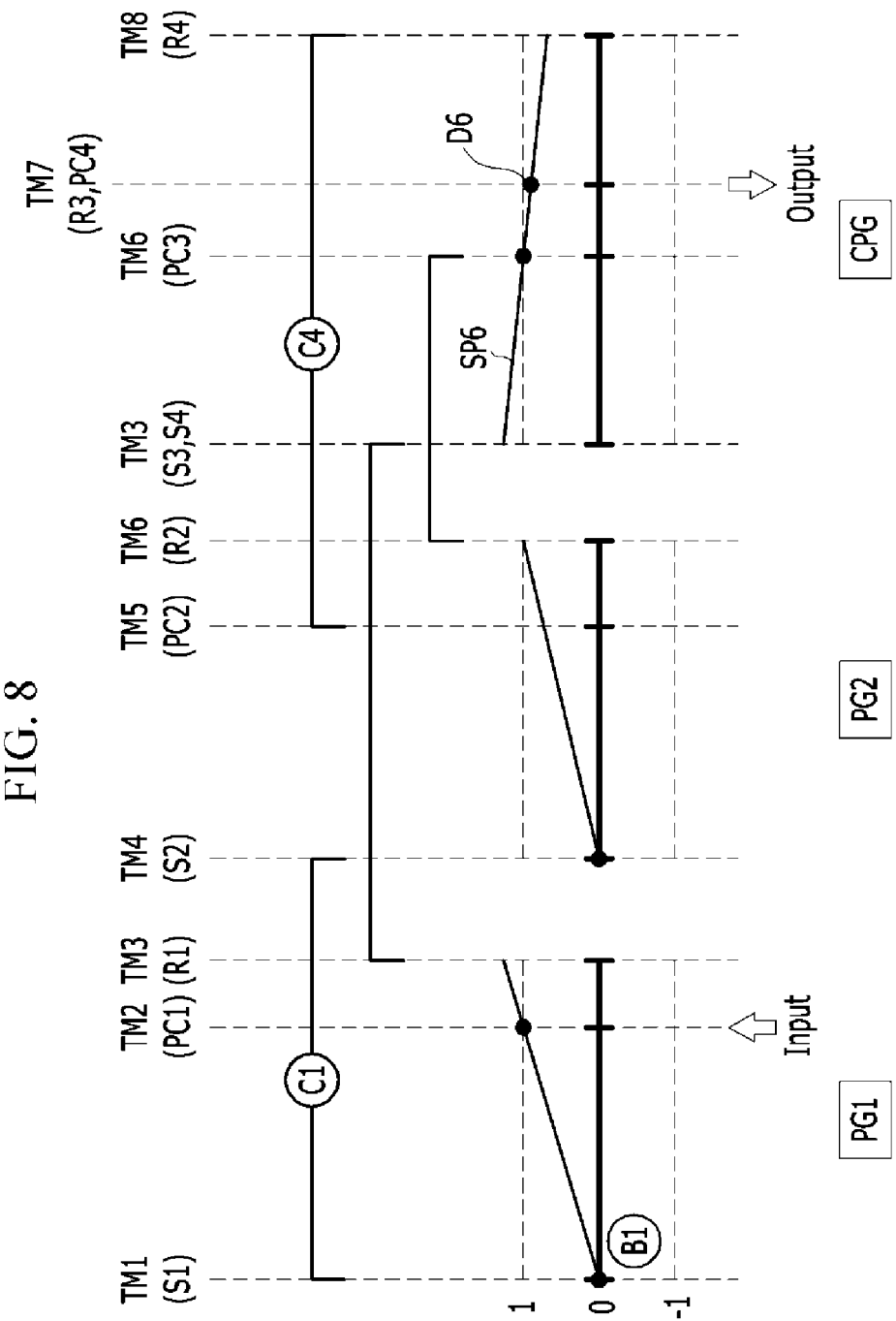
FIG. 8 is a shift diagram for a sixth forward speed of a planetary gear train according to an exemplary embodiment of the present invention.

Then, as shown in FIG. 8, while torque is input through the second rotating body TM2, the first rotating body TM1 and the fourth rotating body TM4 are interconnected by the operation of the first clutch C1, the fifth rotating body TM5 and the eighth rotating body TM8 are interconnected by the operation of the fourth clutch C4, and simultaneously, the first rotating body TM1 and the fourth rotating body TM4 act as fixed elements by the operation of the first brake B1.

Accordingly, the first and second planetary gear sets PG1 and PG2 and compound planetary gear set CPG monolithically interconnected as a whole, the compound planetary gear set CPG forms a sixth speed line SP6, and shifting to the sixth forward speed is achieved by outputting D6 through the output element of the seventh rotating body TM7.

[Seventh Forward Speed]

For the seventh forward speed 7TH, the first brake B1 operated at the sixth forward speed is released, and the second clutch C2 is operated.

Figure 9:
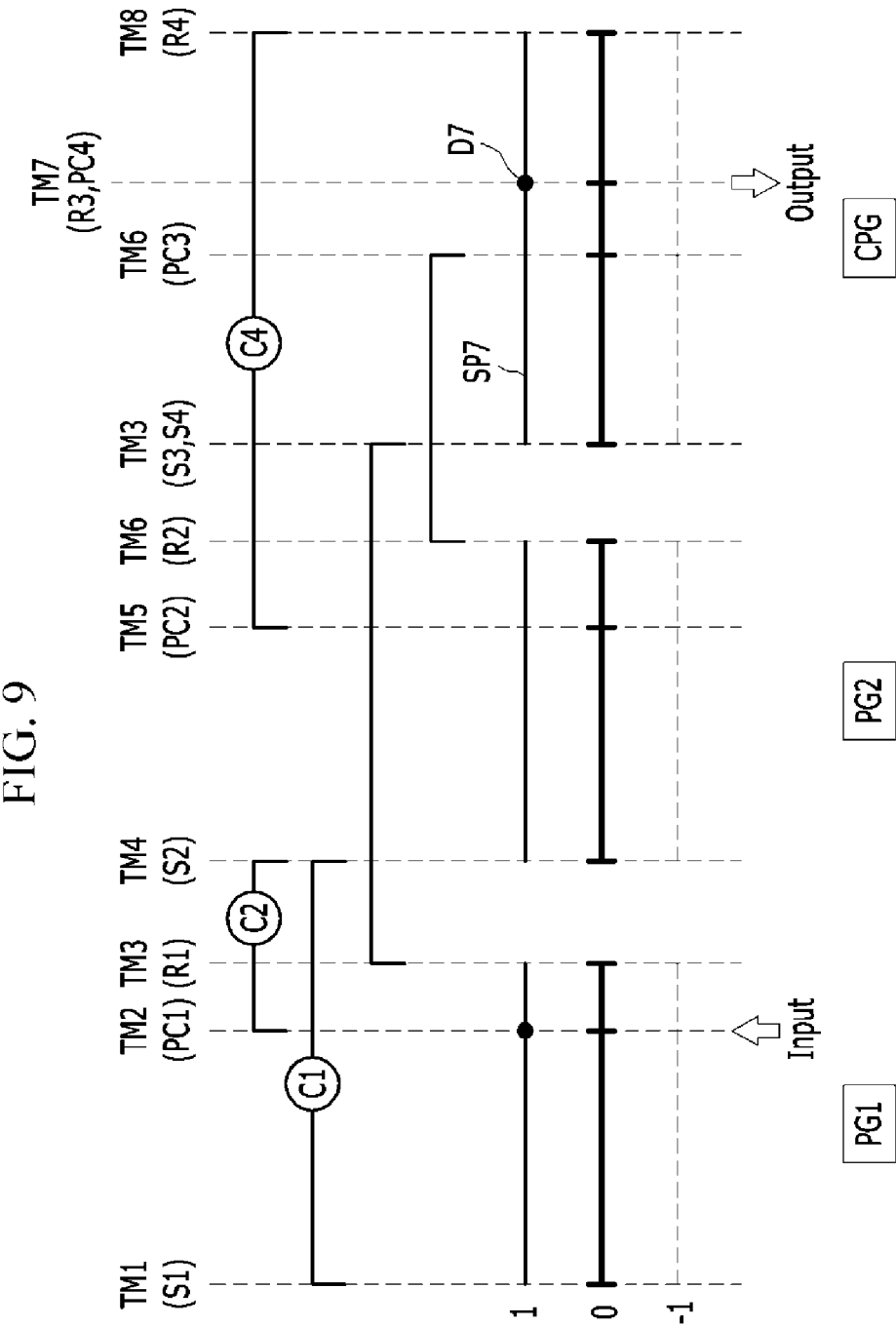
FIG. 9 is a shift diagram for a seventh forward speed of a planetary gear train according to an exemplary embodiment of the present invention.

Then, as shown in FIG. 9, while torque is input through the second rotating body TM2, the first rotating body TM1 and the fourth rotating body TM4 are interconnected by the operation of the first clutch C1, the second rotating body TM2 and the fourth rotating body TM4 are interconnected by the operation of the second clutch C2, and simultaneously, the fifth rotating body TM5 and the eighth rotating body TM8 are interconnected by the operation of the fourth clutch C4.

Accordingly, the compound planetary gear set CPG forms a seventh speed line SP7 by the cooperative operation of the first and second planetary gear sets PG1 and PG2, and shifting to the seventh forward speed is achieved by outputting D7 through the output element of the seventh rotating body TM7.

[Eighth Forward Speed]

For the eighth forward speed 8TH, the first clutch C1 operated at the seventh forward speed is released, and the first brake B1 is operated.

Figure 10:
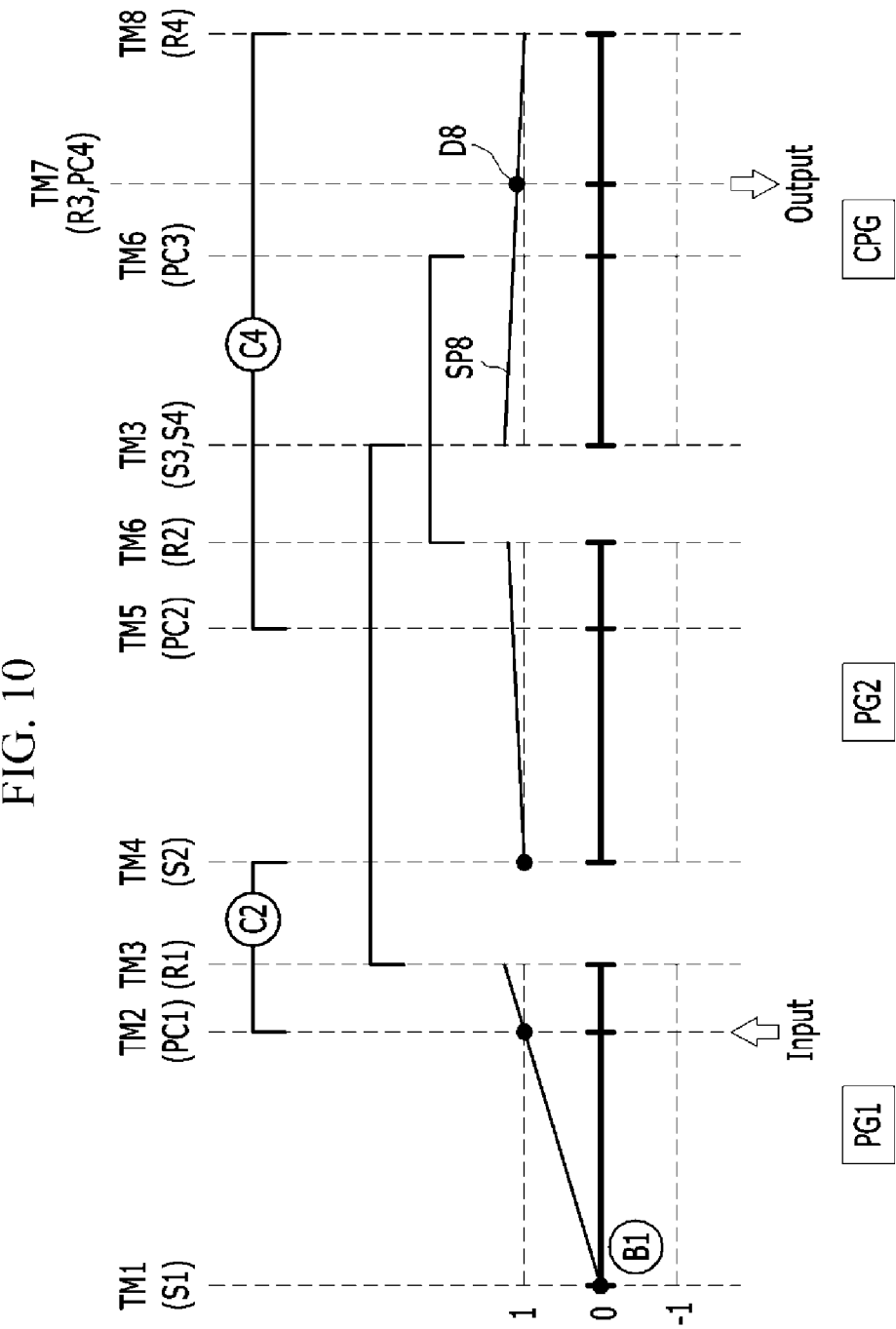
FIG. 10 is a shift diagram for an eighth forward speed of a planetary gear train according to an exemplary embodiment of the present invention.

Then, as shown in FIG. 10, while torque is input through the second rotating body TM2, the second rotating body TM2 and the fourth rotating body TM4 are interconnected by operation of the second clutch C2, the fifth rotating body TM5 and the eighth rotating body TM8 are interconnected by the operation of the fourth clutch C4, and simultaneously, the first rotating body TM1 acts as a fixed element by the operation of the first brake B1.

Accordingly, the compound planetary gear set CPG forms a eighth speed line SP8 by the cooperative operation of the first and second planetary gear sets PG1 and PG2, and shifting to the eighth forward speed is achieved by outputting D8 through the output element of the seventh rotating body TM7.

[Ninth Forward Speed]

For the ninth forward speed 9TH, the second clutch C2 operated at the eighth forward speed is released, and the third clutch C3 is operated.

Figure 11:
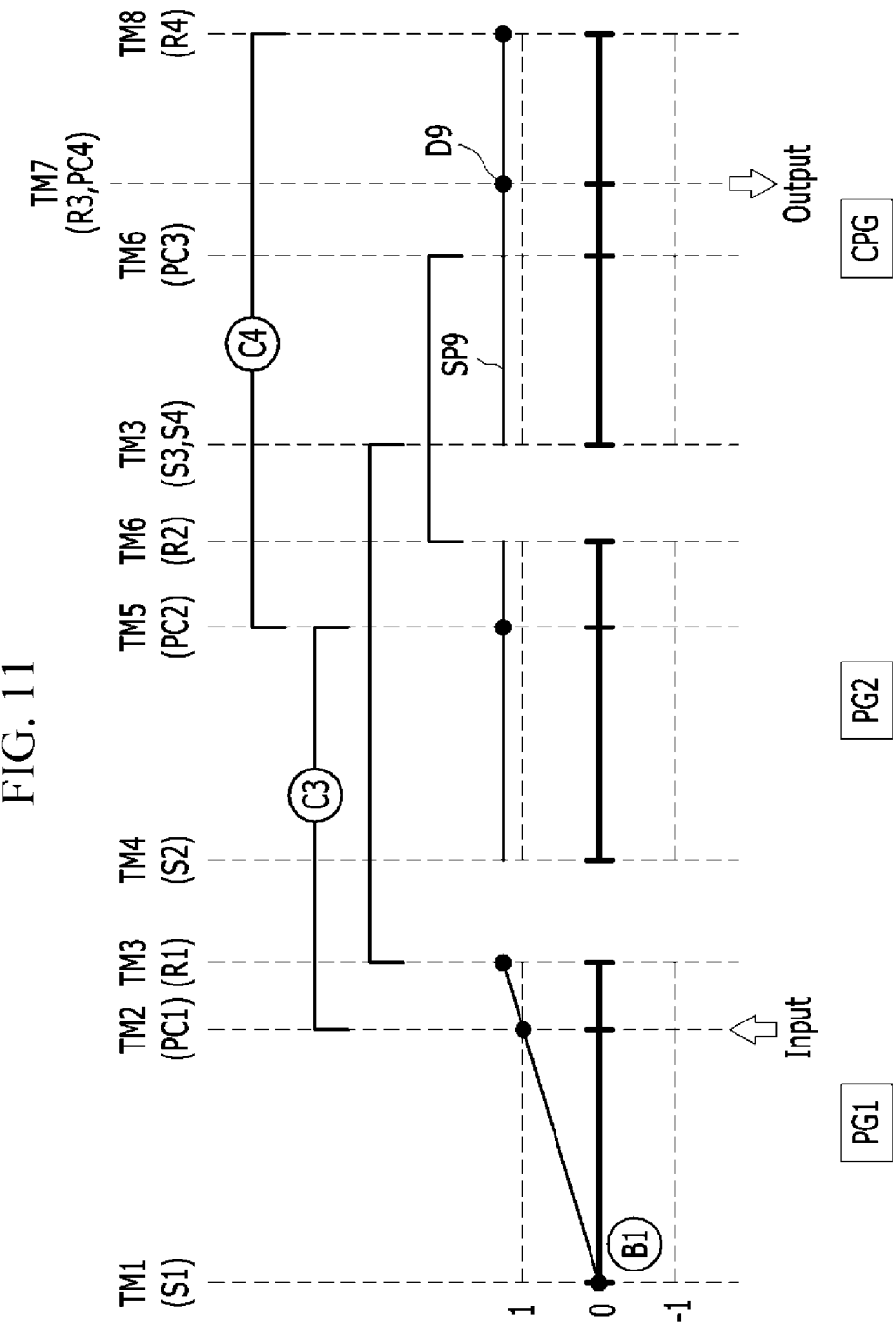
FIG. 11 is a shift diagram for a ninth forward speed of a planetary gear train according to an exemplary embodiment of the present invention.

Then, as shown in FIG. 11, while torque is input through the second rotating body TM2, the second rotating body TM2 and the fifth rotating body TM5 are interconnected by operation of the third clutch C3, the fifth rotating body TM5 and the eighth rotating body TM8 are interconnected by the operation of the fourth clutch C4, and simultaneously, the first rotating body TM1 acts as a fixed element by the operation of the first brake B1.

Accordingly, the compound planetary gear set CPG forms a ninth speed line SP9 by the cooperative operation of the first and second planetary gear sets PG1 and PG2, and shifting to the ninth forward speed is achieved by outputting D9 through the output element of the seventh rotating body TM7.

[Tenth Forward Speed]

For the tenth forward speed 10TH, the fourth clutch C4 operated at the ninth forward speed is released, and the second clutch C2 is operated.

Figure 12:
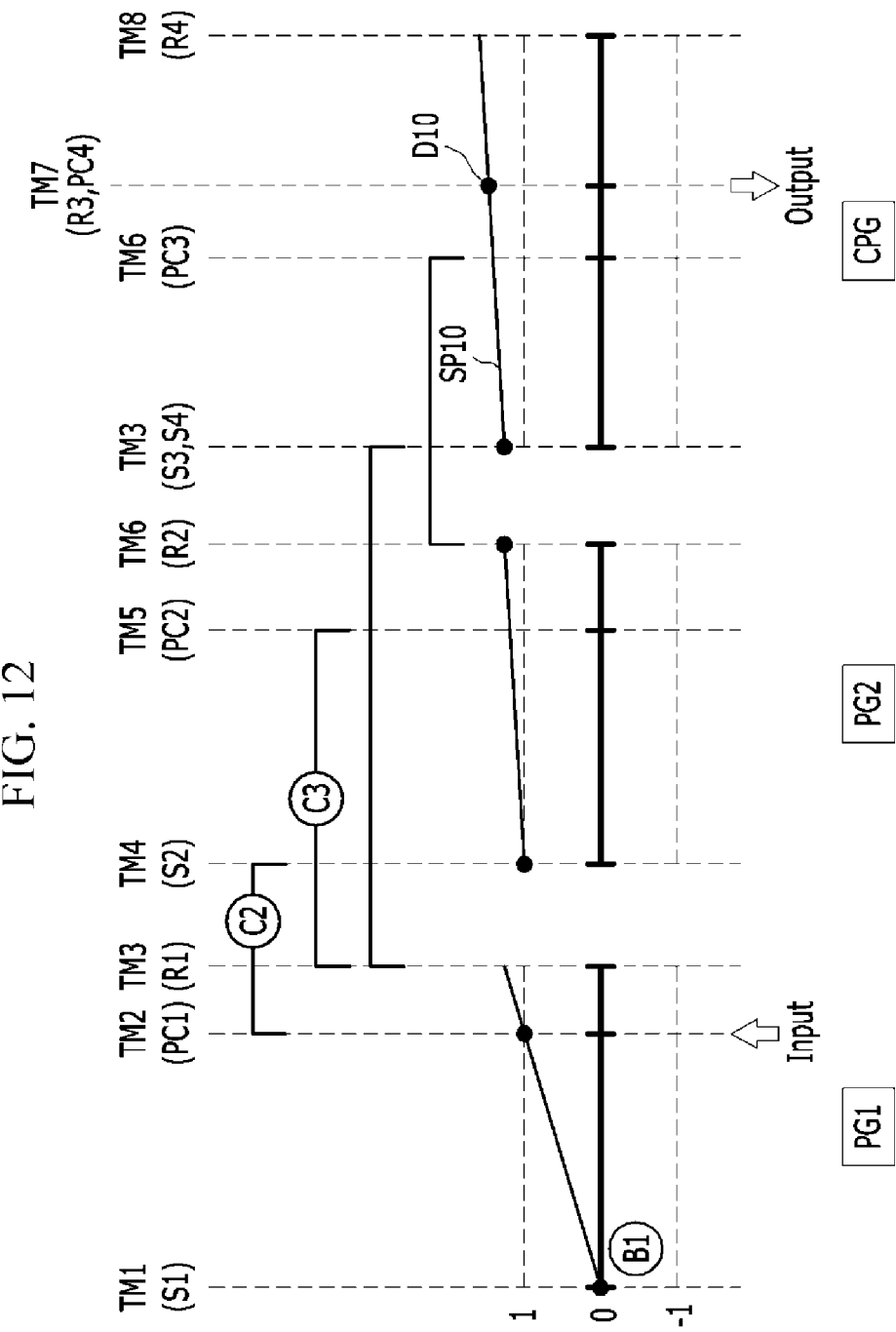
FIG. 12 is a shift diagram for a tenth forward speed of a planetary gear train according to an exemplary embodiment of the present invention.

Then, as shown in FIG. 12, while torque is input through the second rotating body TM2, the second rotating body TM2 and the fourth rotating body TM4 are interconnected by operation of the second clutch C2, the third rotating body TM3 and the fifth rotating body TM5 are interconnected by the operation of the third clutch C3, and simultaneously, the first rotating body TM1 acts as a fixed element by the operation of the first brake B1.

Accordingly, the compound planetary gear set CPG forms a tenth speed line SP10 by the cooperative operation of the first and second planetary gear sets PG1 and PG2, and shifting to the tenth forward speed is achieved by outputting D10 through the output element of the seventh rotating body TM7.

[Eleventh Forward Speed]

For eleventh forward speed 11TH, the second clutch C2 operated at the tenth forward speed is released, and the first clutch C1 is operated.

Figure 13:
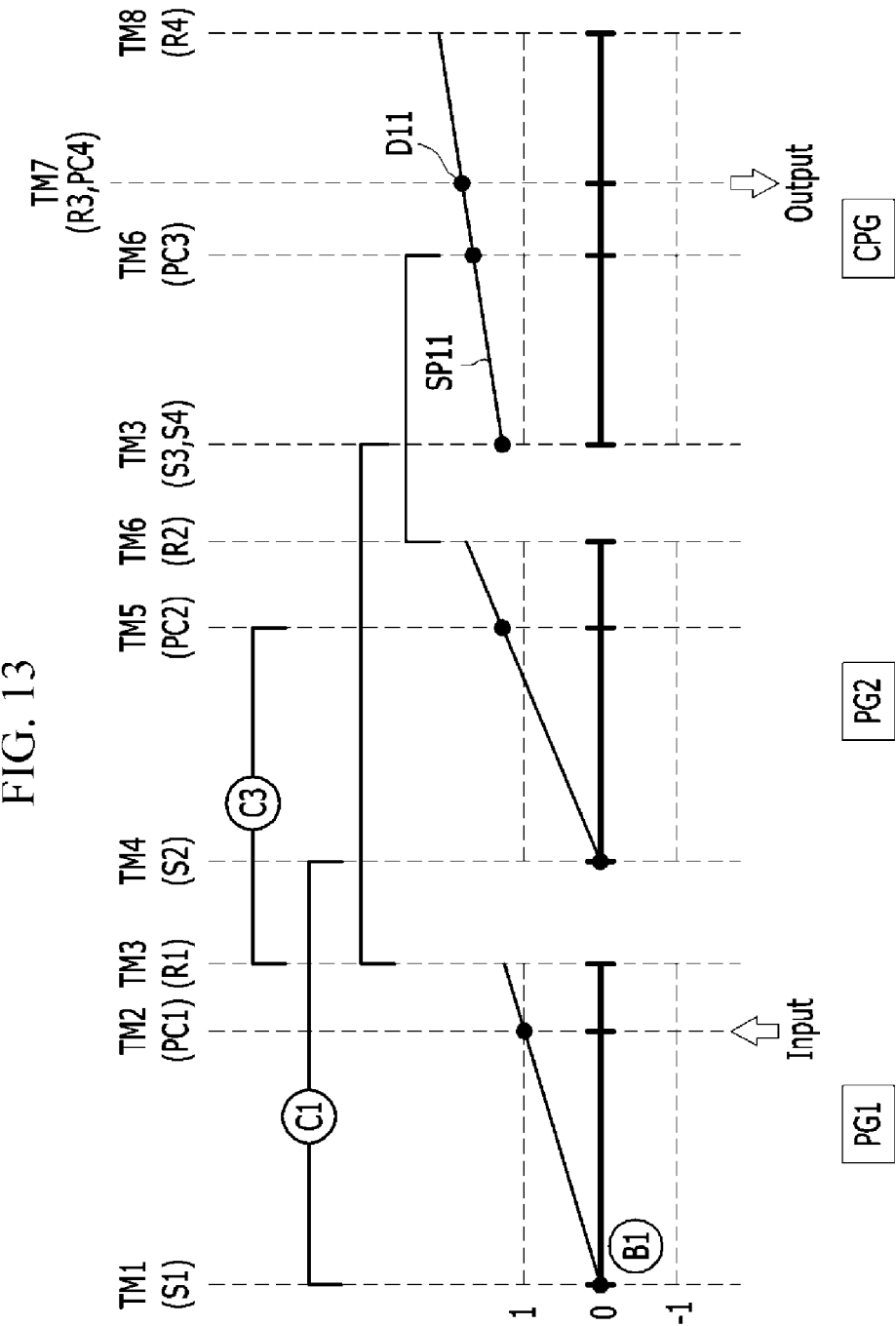
FIG. 13 is a shift diagram for an eleventh forward speed of a planetary gear train according to an exemplary embodiment of the present invention.

Then, as shown in FIG. 13, while torque is input through the second rotating body TM2, the first rotating body TM1 and the fourth rotating body TM4 are interconnected by the operation of the first clutch C1, the third rotating body TM3 and the fifth rotating body TM5 are interconnected by the operation of the third clutch C3, and simultaneously, the first rotating body TM1 and the fourth rotating body TM4 act as fixed elements by the operation of the first brake B1.

Accordingly, the compound planetary gear set CPG forms a eleventh speed line SP11 by the cooperative operation of the first and second planetary gear sets PG1 and PG2, and shifting to the eleventh forward speed is achieved by outputting D11 through the output element of the seventh rotating body TM7.

[Reverse Speed]

For the reverse speed REV, the second clutch C2, the fourth clutch C4, and the second brake B2 is operated.

Figure 14:
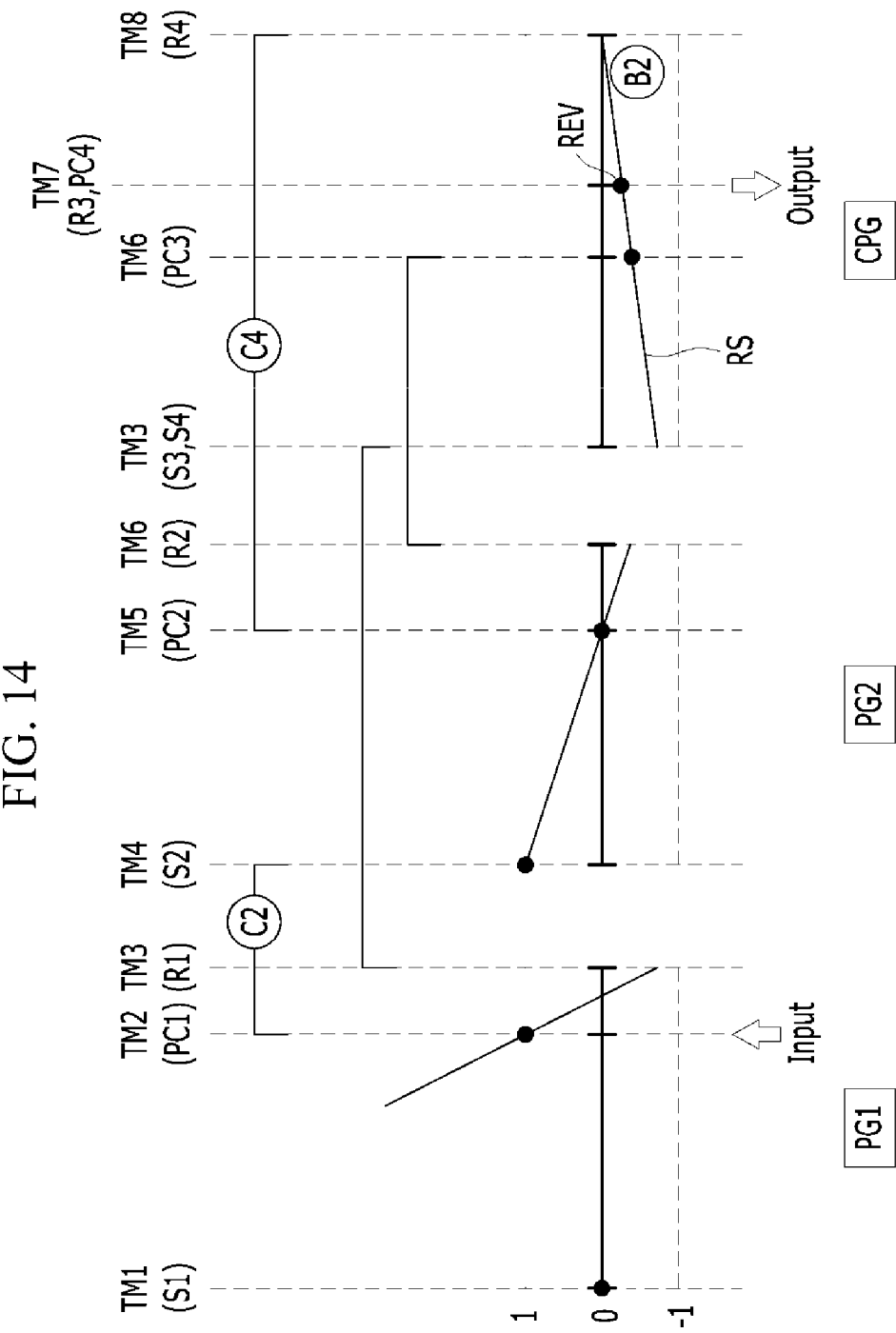
FIG. 14 is a shift diagram for a reverse speed of a planetary gear train according to an exemplary embodiment of the present invention.

Then, as shown in FIG. 14, while torque is input through the second rotating body TM2, the second rotating body TM2 and the fourth rotating body TM4 are interconnected by operation of the second clutch C2, the fifth rotating body TM5 and the eighth rotating body TM8 are interconnected by the operation of the fourth clutch C4, and simultaneously, the eighth rotating body TM8 acts as a fixed element by the operation of the second brake B2.

Accordingly, the compound planetary gear set CPG forms a reverse speed line RS by the cooperative operation of the first and second planetary gear sets PG1 and PG2, and shifting to the reverse speed is achieved by outputting REV through the output element of the seventh rotating body TM7.

As described above, a planetary gear train according to an exemplary embodiment of the present invention achieves eleventh forward speed and one reverse speed by controlling four planetary gear sets PG1, PG2, PG3, and PG4 through operation of four clutches C1, C2, C3, and C4 and two brakes B1 and B2.

Accordingly, a planetary gear train according to an exemplary embodiment of the present invention improves power delivery efficiency and fuel consumption of an automatic transmission.

Furthermore, by operating merely three frictional elements for each shift-speed, the number of non-acting frictional elements, and thereby, power delivery efficiency and fuel consumption are further improved by reducing friction loss.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving a torque of an engine;
    an output shaft outputting a changed torque;
    a first planetary gear set disposed at the input shaft and having a first sun gear, a first planet carrier, and first ring gear;
    a second planetary gear set disposed rearward to the first planetary gear set and having a second sun gear, a second planet carrier, and a second ring gear;
    a third planetary gear set disposed rearward to the second planetary gear set and having a third sun gear, a third planet carrier, and a third ring gear;
    a fourth planetary gear set disposed rearward to the third planetary gear set and having a fourth sun gear, a fourth planet carrier, and fourth ring gear;
    a first rotating body including the first sun gear;
    a second rotating body including the first planet carrier and being directly connected the input shaft;
    a third rotating body including the first ring gear and the third and fourth sun gears;
    a fourth rotating body including the second sun gear;
    a fifth rotating body including the second planet carrier;
    a sixth rotating body including the second ring gear and the third planet carrier;

a seventh rotating body including the third ring gear and the fourth planet carrier and being directly connected to the output shaft;

an eighth rotating body including the fourth ring gear;

a first clutch variably connecting the first rotating body and the fourth rotating body;

a second clutch variably connecting the second rotating body and the fourth rotating body;

a third clutch variably connecting the third rotating body and the fifth rotating body;

a fourth clutch variably connecting the fifth rotating body and the eighth rotating body;

a first brake variably connecting the first rotating body and a transmission housing; and a second brake variably connecting the eighth rotating body and the transmission housing.

2. The planetary gear train of claim 1, wherein the first, second, third, and fourth planetary gear sets are respectively single pinion planetary gear sets.

3. The planetary gear train of claim 1, wherein a first forward speed is achieved by simultaneous operation of the second and the third clutch and the second brake;

a second forward speed is achieved by simultaneous operation of the first and third clutches and the second brake;

a third forward speed is achieved by simultaneous operation of the first, second clutch and the second brake;

a fourth forward speed is achieved by simultaneous operation of the first clutch and the first and second brakes;

a fifth forward speed is achieved by simultaneous operation of the first and fourth clutches and the second brake;

a sixth forward speed is achieved by simultaneous operation of the first and fourth clutches and the first brake;

a seventh forward speed is achieved by simultaneous operation of the first and second clutches and the fourth clutch;

an eighth forward speed is achieved by simultaneous operation of the second and fourth clutches and the first brake;

a ninth forward speed is achieved by simultaneous operation of the third and fourth clutches and the first brake;

a tenth forward speed is achieved by simultaneous operation of the second and third clutches and the first brake;

an eleventh forward speed is achieved by simultaneous operation of the first and third clutches and the first brake; and a reverse speed is achieved by simultaneous operation of the second and fourth clutches and the second brake.

* * * * *